(12) United States Patent
Hegoas et al.

(10) Patent No.: US 6,173,499 B1
(45) Date of Patent: Jan. 16, 2001

(54) VENT COVER FOR AN ELECTRIC SAW

(76) Inventors: Gary M. Hegoas; Raymond L. Hegoas, both of 35315 Sierra Vista Dr., Agua Dulce, CA (US) 91350

( * ) Notice: Under 35 U.S.C. 154(b), the term of this patent shall be extended for 0 days.

(21) Appl. No.: 09/207,382

(22) Filed: Dec. 8, 1998

Related U.S. Application Data

(60) Provisional application No. 60/065,600, filed on Nov. 18, 1997.

(51) Int. Cl.⁷ .................................................. B27B 19/09
(52) U.S. Cl. ............................................. 30/123.3; 30/390
(58) Field of Search ............................. 30/124, 393, 394, 30/123.3, 390; 83/478

(56) References Cited

U.S. PATENT DOCUMENTS

| | | | |
|---|---|---|---|
| 3,267,974 | * | 8/1966 | Elson .................................. 30/123.3 |
| 4,195,403 | * | 4/1980 | Gruber ................................. 30/123.3 |
| 5,084,971 | * | 2/1992 | Remington et al. ................. 30/123.3 |
| 5,199,174 | * | 4/1993 | Wild .................................... 30/123.3 |
| 5,539,985 | * | 7/1996 | Wershe ................................ 30/123.3 |
| 5,689,884 | * | 11/1997 | Wershe ................................ 30/123.3 |

\* cited by examiner

*Primary Examiner*—Kenneth E. Peterson
*Assistant Examiner*—Melissa L. Hall
(74) *Attorney, Agent, or Firm*—Roger A. Marrs

(57) ABSTRACT

A vent cover for an electric saw for removing waste sawdust, dust or debris from a work area so as to maintain a guideline free from visual obstruction including a shell having an opening at its back end and one side being opened so that the shell may be detachably connected to the side of the saw body immediately ahead of the motor armature discharge baffling. The front end of the shell is curved and the top of the shell is tapered forwardly so that the exhaust air enters the rear of the shell and is directed by the curvature of the tapered top and curved front end to be conducted laterally across the front of the saw blade to forcibly remove sawdust. The shell includes an edge marginal region along the top front end and bottom for detachably coupling to the side of the saw body.

3 Claims, 1 Drawing Sheet

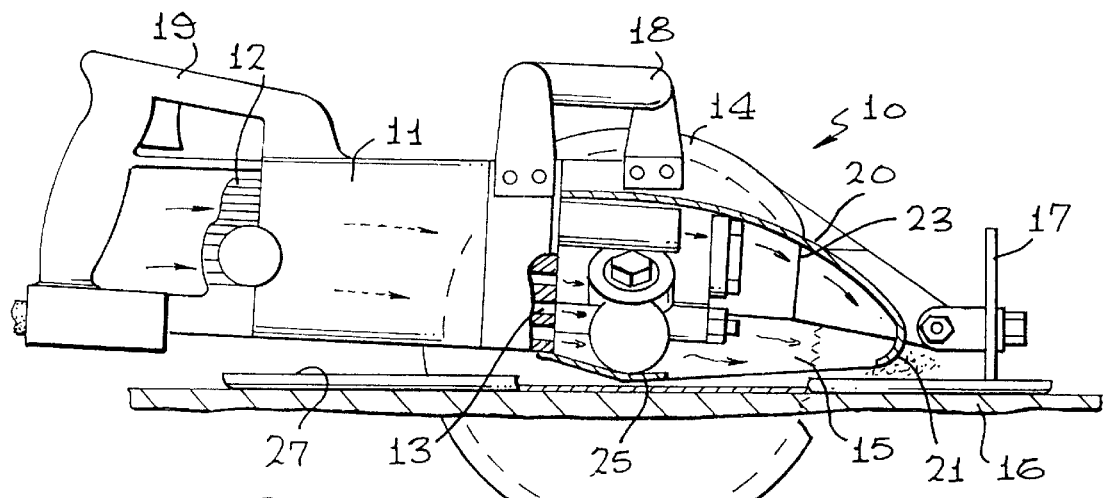
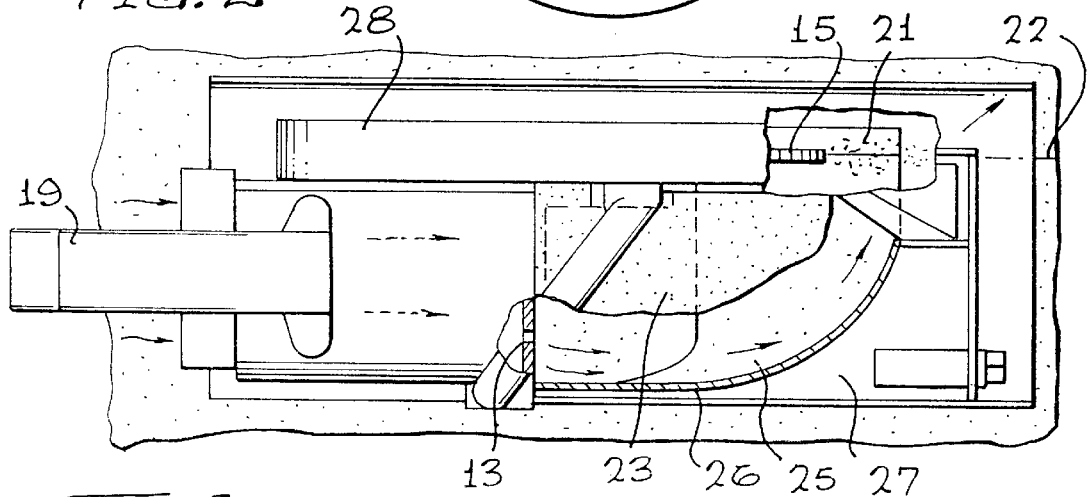
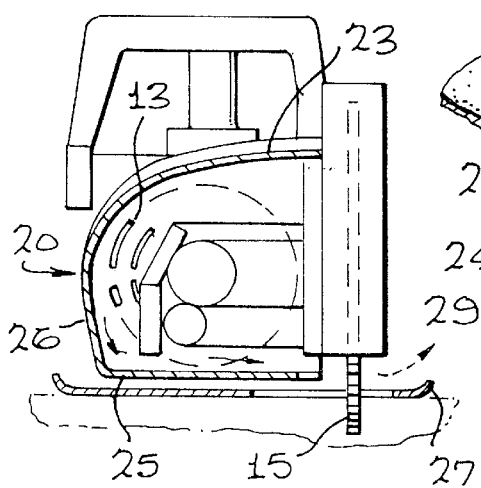
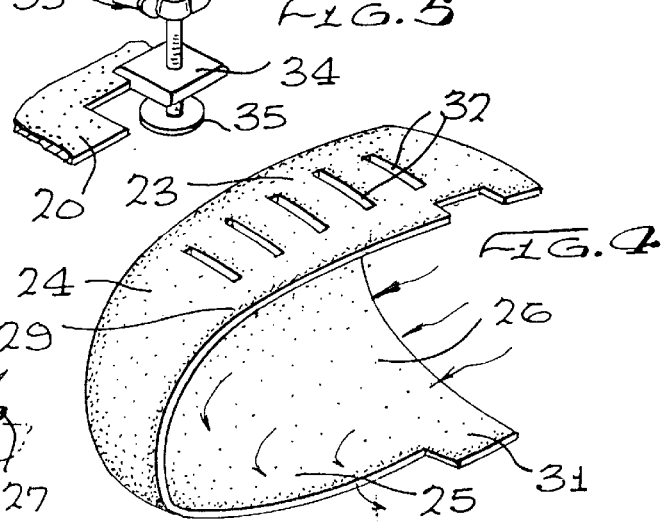

VENT COVER FOR AN ELECTRIC SAW

Priority based on Ser. No. 60/065,600 filed Nov. 18, 1997.

BACKGROUND OF THE INVENTION

1. Field of the Invention

The present invention relates to the field of electric tools, and more particularly to a novel vent cover detachably connected to the body of an electric motor on a saw so as to divert exhaust air from the motor to the workpiece so that accumulated dust or sawdust is blown away.

2. Brief Description of the Prior Art

In the past, it has been the conventional practice to use an electric handsaw having a rotating blade for cutting material such as wood or the like. In the usual practice, a guideline is placed on the working surface of the workpiece and the edge of the sawblade is directed along the guideline by visual alignment of the user with the line. As the blade is rotated by an electric motor, the blade cuts along the guideline as intended and predicted. However, as the cutting proceeds, sawdust, debris, dust or the like may collect ahead of the sawblade and cover the guideline so that the operator's visibility is impaired. Such impairment sometimes causes the cut to diverge from the guideline and the workpiece is then rendered useless since the cut is in the wrong place.

Therefore, a long-standing need has existed to provide a novel means for removing sawdust, dirt or the like from the area on a workpiece immediately ahead of the cutting blade so that the operator's vision is not obscured. Particularly when employing an electric saw, the sawdust is collected ahead of the saw to cover the guideline and the exhaust air from the electric motor is discharged along the side of the saw body and in some instances, the exhaust air contributes to the collection of sawdust on the line intended to be followed by the saw cut. Means may be provided for detachably connecting to the side of the saw body which would take advantage of the exhaust air so that the accumulation of sawdust is blown away or removed rather than collected.

SUMMARY OF THE INVENTION

Accordingly, the above problems and difficulties are avoided by the present invention which provides a novel vent cover for an electric saw which will readily remove and distribute waste sawdust, dust or debris from a workpiece so as to maintain a guideline free from visual obstruction. In one form of the invention, the vent cover includes a shell having an opening at its back end and one side being opened so that the shell may be detachably connected to the side of the saw body immediately ahead of the motor armature discharge baffling. The front end of the shell is curved and the top of the shell is tapered forwardly so that the exhaust air from the armature enters the rear of the shell and is directed by the curvature of the tapered top and curved front end to be conducted laterally across the front of the saw blade to forcibly remove sawdust or the like that would normally collect on the workpiece covering the guideline as the saw is advanced. The shell includes an edge marginal region along the top front end and bottom which includes means for detachably coupling to the side of the saw body. Such means may include a releasable fastener or may take the form of an interference fit with other components normally carried on the body of the saw. A further feature resides in providing a curved front end not only from the top to the bottom but from the closed side of the shell towards the opposite side opening. Thus, the airstream or the exhaust air from the armature passes through the vent baffling and is redirected by the interior surface of the shell into a lateral discharge across the front of the sawblade.

Therefore, it is among the primary objects of the present invention to provide a novel cover for an electric saw which will detachably connect to the saw body and serve to redirect motor exhaust air laterally across the cutting position of the sawblade.

Another object of the present invention is to provide a novel shell detachably coupled to the side of a saw body for directing exhaust air across the front of a rotating sawblade for removal of sawdust or the like.

A further object of the present invention is to provide a novel means for employing exhaust air from an electric motor on a handtool across the working surface of a workpiece so as to remove debris or the like from the surface during the performance of a cutting or shaping operation.

A further object resides in providing means readily attachable to an existing saw body which will divert exhaust air from discharge vents along the side of the saw body and redirecting the exhaust across the surface of the workpiece ahead of the saw in order to clear the surface of debris, sawdust or the like.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a side elevational view of a conventional saw having an electric motor with the exhaust diverting means of the present invention illustrated in section;

FIG. 2 is a top plan view of the electric saw shown in FIG. 1 illustrating the exhaust diverting means of the present invention for directing exhaust discharge across the front of the cutting blade;

FIG. 3 is a front elevational view of the electric saw with the means for diverting exhaust discharge illustrated in section; and FIG. 4 is a front perspective view of the inventive means for redirecting exhaust air flow being discharged from the motor of the electric saw and FIG. 5 shows a clamp.

DESCRIPTION OF THE PREFERRED EMBODIMENT

Referring to FIG. 1, an electric saw incorporating the novel cover of the present invention is illustrated in the general direction of arrow 10. The saw includes a cylindrical body 11 housing an electric motor which draws air in from the back end, broadly identified by numeral 12, and through the motor, particularly the armature, for discharge through baffling or vents 13. The flow of air through the motor is illustrated by the arrows and the exhaust is along the side of the body 11 and across the side of the front end of the sawblade housing, broadly identified by numeral 14. The forward housing 14 encloses a rotating sawblade 15 which is employed to cut through a workpiece such as wood 16. A foot 17 is employed to adjust for elevation or thickness and does not form a part of the present invention.

The body of the saw further includes a pair of handles 18 and 19 which are grasped by the user so that the front of the sawblade 15 can be directed as desired by the operator. In order to redirect the vented discharge of air from the armature and motor of the saw, an inventive shell 20 is employed. The shell is detachably connected ahead of the discharge vents 13 so that the discharge air is redirected to a position ahead of the sawblade 15 on the working surface of the workpiece 16. It can be seen that during a normal sawing operation, there is a collection of sawdust 21. The sawdust collects on the surface of the workpiece and obscures a guideline 22 shown in FIG. 2.

Referring now in detail to FIG. 2, it can be seen that under normal sawing conditions, the line 22 is immediately ahead of the cutting saw 15 and that the collection of sawdust 21 obscures this line so that the operator has difficulty in following the line during a cutting procedure. In both FIGS. 1 and 2, it can be seen that the airflow is diverted downwardly after leaving the discharge vents 13 by means of a forwardly tapered upper panel 23 and laterally towards the line 22 immediately ahead of the blade 15 by means of a curved front end 24.

Referring further to FIGS. 1 and 2, the bottom of the shell 20 is indicated by numeral 25 while the side of the shell blending in a curve with front end 24 is indicated by numeral 26. Ambient air drawn through the motor housing 11 and exiting through the baffle or vent 13 enters into the interior of the shell 20 and impinges against the interior wall. Impinging against the front curved wall 24 as well as the curve of the top wall or panel 23 causes diversion of the air flow from a straight or linear line into a curved direction aimed at the front of the sawblade 15 and across the guideline 22 on the surface of the workpiece. Therefore, the full force of the discharge air is employed to blow or force the sawdust, debris or dirt away from the guideline 22 immediately ahead of the sawblade 15. FIG. 2 further shows that the saw is mounted on a sliding base 27 and that the rotating blade 15 is mounted within a blade housing 28.

Referring now in detail to FIG. 3, it can be seen that the bottom of the shell 20, as indicated by numeral 25, is flat and is integrally joined with the sidewall 26 that, in turn, is integrally formed with the curved and tapered top wall or panel 23.

In FIG. 4, the shell 20 is illustrated showing that the interior of the shell is hollow except for the opening at its rear end and an opening on one side. The opposite side from the open side is indicated by numeral 26 and the top is indicated by numeral 23. It is noted that the top wall 23 tapers downwardly towards the front end of the shell to terminate in a downwardly projecting curve and is integral with the front wall or panel 24. The top wall 23 includes a cutout 30 which is employed to insertably receive or accommodate the thickness of the handle 18 at the point where the handle connects with the housing 28. Also, the bottom 25 includes a projection 31 which proceeds beneath the housing 28 and terminates immediately adjacent to the blade 15. The shell includes an edge marginal region 29 along the top 23, the bottom 25, and the front end 24 which defines the open side. Therefore, it can be seen that by means of the recess 30 and the projection 31 an interference or snap-lock relationship exists to detachably connect the shell to the electric shell body or housing. The flow of exhaust air is indicated by the arrows where the exhaust air enters through the rear opening of the shell and is directed downwardly and laterally by the curved top and front walls so that a blast of air is directed immediately ahead of the rotating blade 15 at the point where the blade meets the guideline 22 on the surface of the work-piece.

In actual practice, the shell 20 is made of a unitary construction having interference fit or snap-lock fitting means for detachably connecting one side of the shell to the housing of the saw body. The shell is open at the rear and is coextensive with a side opening on the side of the shell attached to the housing. Therefore, an enclosed passageway is provided for directing the exhaust air from the discharge vents 13 to the point immediately ahead of the rotating sawblade. The shell 20 may include a plurality of vents 32 provided across the top thereof in order to draw ambient air surrounding the shell into the interior thereof. The ambient air then mixes with the exhaust air exiting from the vented baffle 13.

FIG. 5 shows a releasable clamp in the direction of arrow 33 which secures the shell 20 to the saw housing. The clamp includes a wing-nut screw or the like threaded into a reinforced section 34 on the shell. The end of the screw has an engagement plate 35 that makes contact with the housing.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope,of this invention.

What is claimed is:

1. A vent cover for an electric saw for removing waste sawdust, dust and debris from a work area to maintain a guidline free from visual obstruction comprising:

a one-piece shell having a top, a solid side, a bottom and a curved front end integrally joined together to provide a unitary single piece construction with an open intake back end and an open exhaust side opposite to said solid side;

said shell includes an edge marginal region along said top, said bottom and said curved front end defining said open exhaust side and constituting a detachable interference-type coupling for releasably supporting said shell to the electric saw;

said shell being adapted such that exhaust air from said saw enters said open intake back end and is conducted laterally by said curved front end across the interior of said shell for discharge through said open exhaust side; and a plurality of elongated slots in said top arranged in fixed parallel spaced-apart relationship through which ambient air surrounding said shell is drawn into mixing relationship with respect to said exhaust air.

2. A vent cover for an electric saw for removing sawdust, dust, and debris from a work area to maintain a guideline free from visual obstruction comprising:

a shell having a top and a solid side;

a bottom and a curved front end integrally joined together to provide a unitary single piece construction with an open back end and an open side opposite to said solid side;

said shell includes an edge marginal region along said top, said bottom and said front end defining said open side and constituting a detachable coupling for releasably support said shell to the electric saw;

said shell being adapted such that exhaust air from said saw enters said open back end and is conducted laterally across said shell for discharge through said open side;

a plurality of elongated slots in said top arranged in fixed parallel spaced-apart relationship through which ambient air surrounding said shell is drawn into mixing relationship with respect to said exhaust air; and said shell curved front end is curved immediately ahead of and joining said top with said bottom and cooperating with said solid side to divert the exhaust air laterally to exit through said open exhaust side.

3. The vent cover defined in claim 2 wherein:

said top is downwardly tapered from said open back intake end to said curved front end.

* * * * *